(12) United States Patent
Jones et al.

(10) Patent No.: US 6,811,497 B1
(45) Date of Patent: Nov. 2, 2004

(54) LIQUID CENTER FOR GOLF BALLS

(75) Inventors: Douglas E. Jones, Dartmouth, MA (US); Murali Rajagopalan, Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/453,697

(22) Filed: Dec. 3, 1999

Related U.S. Application Data

(63) Continuation-in-part of application No. 09/123,425, filed on Jul. 20, 1998, now Pat. No. 6,025,442, which is a continuation of application No. 09/658,338, filed on Jun. 5, 1996, now Pat. No. 5,824,746, which is a continuation-in-part of application No. 09/482,514, filed on Jun. 7, 1995, now Pat. No. 5,703,166, which is a continuation-in-part of application No. 08/377,553, filed on Jan. 24, 1995, now abandoned.

(51) Int. Cl.⁷ .............................................. A63B 37/12
(52) U.S. Cl. ....................................................... 473/376
(58) Field of Search ................................ 473/376–378, 473/373–374, 371, 361, 367, 351, 357, 354, 356

(56) References Cited

U.S. PATENT DOCUMENTS

| | | | | |
|---|---|---|---|---|
| 5,334,673 A | * | 8/1994 | Wu ........................ | 273/235 R |
| 5,542,663 A | * | 8/1996 | Kato et al. ................... | 473/363 |
| 5,803,831 A | * | 9/1998 | Sullivan et al. ............. | 473/374 |
| 5,823,891 A | * | 10/1998 | Winskowicz ................ | 473/378 |
| 5,824,746 A | * | 10/1998 | Harris et al. ................ | 525/196 |
| 5,836,831 A | * | 11/1998 | Stanton et al. .............. | 473/354 |
| 5,981,658 A | * | 11/1999 | Rajagopalan et al. ......... | 525/72 |
| 6,135,899 A | * | 10/2000 | Maruko ...................... | 473/376 |
| 6,227,987 B1 | * | 5/2001 | Kato .......................... | 473/373 |
| 6,371,869 B1 | * | 4/2002 | Kato et al. .................. | 473/365 |

* cited by examiner

*Primary Examiner*—Raeann Gorden
(74) *Attorney, Agent, or Firm*—Swidler Berlin Shereff Friedman, LLP

(57) ABSTRACT

The present invention is directed toward golf balls with improved resistance to water permeation. These golf balls comprise cover, core and, optionally, intermediate layers, with at least one of these layers including a polymer blend that provides resistance to water permeation through that layer. The polymer blends that provide the disclosed resistance to water permeation comprise at least one hydrophilic thermoplastic polymer and at least one hydrophobic polymer. Most importantly, the golf balls formed with the polymer blends of the present invention also exhibit essentially unchanged physical and performance characteristics including coefficient of restitution, compression and initial velocity.

45 Claims, 2 Drawing Sheets

Center shell comprises hydrophilic and hydrophobic polymers

LIQUID CENTER FOR GOLF BALLS

CROSS-REFERENCE TO RELATED APPLICATIONS

This application is a continuation-in-part of U.S. patent application Ser. No. 09/123,425, filed Jul. 20, 1998, now U.S. Pat. No. 6,025,442, which is a continuation of U.S. patent application Ser. No. 09/658,338, filed Jun. 5, 1996, now U.S. Pat. No. 5,824,746, which is a continuation-in-part of U.S. patent application Ser. No. 09/482,514, filed June 7, 1995, now U.S. Pat. No. 5,703,166, which is a continuation-in-part of U.S. patent application Ser. No. 08/377,553, filed Jan. 24, 1995, now abandoned. The entire disclosure of these applications are incorporated by reference herein.

FIELD OF INVENTION

This invention relates to two-piece, three-piece and multi-component fluid center golf balls comprising one or more layers formed with compositions that provide increased resistance to water permeation while still exhibiting good ball properties. These compositions may be incorporated into the cover and/or the core of a two-piece ball, or within the cover, core, center, and/or intermediate layer of a three-piece or multi-component golf ball.

BACKGROUND OF THE INVENTION

Conventional golf balls can be divided into several general types or groups: (1) one-piece balls; (2) two-piece balls; (3) wound balls; and (4) other balls with three or more layers. The difference in play characteristics resulting from these different constructions can be quite significant.

Balls having a two-piece construction are generally most popular with the average recreational golfer because they provide maximum distance. Two-piece balls commonly include a single solid core, usually formed of a crosslinked rubber. Solid cores are often formed of polybutadiene that is chemically crosslinked with zinc diacrylate and/or similar crosslinking agents. They are covered by a tough, cut-resistant blended cover, formed of a material such as SURLYN®, an ionomer resin produced by E. I. Du Pont de Nemours & Co. of Wilmington, Del. The combination of the core and cover materials imparts a relatively high initial velocity to the ball which results in improved distance. Due to the relative rigidity of these materials, two-piece balls have a hard "feel" when struck with a club.

At the present time, the wound ball remains the preferred ball of the more advanced players due to its spin and feel characteristics. Wound balls typically have either a solid rubber or fluid-filled center around which many yards of a stretched elastic thread or yarn are wound to form a core. The wound core is then covered with a durable cover material such as SURLYN®, or a softer material, such as balata or a castable polyurethane. Wound balls are generally softer and provide more spin than the aforementioned two-piece balls. Particularly with approach shots onto the green, the high spin rate of a soft, wound ball enables the golfer to stop the ball very near its landing position.

Multi-component balls are constructed with a cover and a core, wherein the core further comprises a center and an intermediate layer disposed concentrically between the center and the cover. The intermediate layer may be constructed as a solid layer or a wound layer, where a wound layer comprises many yards of elastic thread that are stretched and wrapped around the center. The core, comprising the center and intermediate layer, is encased within a durable cover material such as a SURLYN® or another similar material, or, alternatively, within a softer cover such as balata or polyurethane. Multi-component golf balls, especially those formed with a wound intermediate layer, are generally softer than a two-piece ball and can provide more spin, enabling a skilled golfer to exert more control over the ball's flight.

Golf ball centers incorporated within, e.g., multi-component balls may be solid or fluid-filled spheres. A variety of methods are known for forming fluid-filled centers, such as those disclosed in U.S. Pat. No. 5,836,831. The '831 patent discloses the use of thermoplastic polymers for forming spheres used in such fluid-filled centers. In the '831 patent, polyether-amide block copolymers are formed into hemispherical half-shells by compression or injection molding. The half-shells may be joined to form hollow spheres in a number of ways including welding, chemical bonding, RF heat sealing, induction bonding, hot wire seaming, co-injection molding or hot melt sealing. Alternatively, the center shell may be formed by extrusion blow molding, co-extrusion blow molding or injection blow molding.

The hollow center spheres are then filled with an appropriate fluid, generally an aqueous salt solution having a specific gravity of from about 1.0 to about 1.6, and preferably, about 1.25. Filling the hollow center spheres may be carried out by piercing the surface with a needle and injecting the fluid. The hole formed may be sealed in a number of ways including the application of adhesives that may be cured with heat or radiation, with solvent or water-based paints, hot melt adhesives or a polymeric material. A solid or wound layer is then applied around the fluid-filled center, using materials and methods well known in the art, to form a golf ball.

Permeation of water through one or more layers of a multi-layer golf ball may affect the properties or performance of that ball. Accordingly, one approach to obviating such water permeation has been to increase the hardness of the base polymer in the composition or blend used to form one or more golf ball layers. For example, different grades of PEBAX®, a polyether-amide block copolymer, demonstrate a decrease in water vapor permeability as the hardness of the grade increases (Elf Atochem, Philadelphia, Pa., technical bulletin: PEBAX®—*Basis of Performance*, page 18). However, such prior attempts to obviate the potential problem of water permeation across a golf ball layer, involving the incorporation of such harder polymeric materials into those layers, have generally led to unfavorable changes in the physical and performance characteristics of golf balls, such as increased compression and stiffness. In addition, although such harder materials are resistant to water permeation, it has been observed that the coefficient of restitution and initial velocity are both lower in balls formed with them. This has been especially problematic with respect to such compositions when employed in the formulation of hollow spheres used for assembly of fluid-filled centers.

Accordingly, there has thus been a long-felt need for golf balls formed with layers having improved resistance to water permeation wherein the materials relied upon for such purpose are capable of substantially preventing water permeation across one or more such layers without substantially affecting the overall physical and performance characteristics of the resultant golf ball. An additional constraint is found in the requirement that these materials should, nevertheless, be amenable to contemporary processes for the production of golf balls, and, more particularly, to the formation of hollow spheres used for the construction of fluid-filled centers. The present invention admirably meets these objectives.

OBJECTS OF THE INVENTION

An object of the present invention is to provide golf balls comprising one or more layers formed with compositions having improved resistance to water permeation while maintaining or even improving the performance characteristics of such balls.

Another object of the present invention is to provide polymer blend compositions comprising hydrophilic thermoplastic polymers and hydrophobic olefinic polymers that are incorporated within one or more layers of a golf ball, such that resistance to water permeation through such layers is substantially improved.

A further object of the present invention is the formation of hollow center shells used in the manufacture of fluid-filled centers for multi-component golf balls, from the blends disclosed herein, thereby substantially preventing fluid permeation across the center shell.

A particular object of the present invention is the provision of a wound golf ball having an improved resistance to water permeation, with a polyurethane, polyurea or epoxy-urethane cover and a fluid-filled center that includes a center shell formed from a blend of a polyether-amide or a polyether-ester block copolymer and a maleic anhydride grafted metallocene-catalyzed copolymer of ethylene and octene, a maleic anhydride grafted metallocene-catalyzed copolymer of ethylene and hexene, or a maleic anhydride grafted metallocene-catalyzed copolymer of ethylene and butene.

SUMMARY OF THE INVENTION

The present invention is directed, in a first embodiment, to a golf ball comprising at least one layer having improved resistance to water permeation. In a preferred embodiment, the ball comprises a fluid-filled center, a cover and at least one intermediate layer interposed between the center and the cover. The fluid-filled center comprises a center shell formed from a composition comprising a blend of at least one hydrophilic thermoplastic polymer and at least one hydrophobic polymer. Preferably, the hydrophobic polymer is compatible with the hydrophilic thermoplastic polymer. The golf ball of the present invention is further characterized in that it has a coefficient of restitution of at least 0.75 and a compression of less than about 110. The intermediate layer may be formed of a plurality of tensioned elastomeric windings or, alternatively, one or more solid layers. Compositions used to form the center shell of the ball may comprise, for example, a blend of a polyether-amide or a polyether-ester block copolymer and a maleic anhydride grafted metallocene-catalyzed copolymer of ethylene and octene, ethylene and hexene, or ethylene and butene, or a blend of these metallocene-catalyzed copolymers.

The present invention is directed, in an alternate embodiment, to a wound golf ball comprising one or more layers having improved resistance to water permeation, which comprises a fluid-filled center, at least one layer of tensioned elastomeric windings surrounding the fluid-filled center, and a cover. In this embodiment, the fluid-filled center comprises a center shell, formed from a composition comprising a blend of a polyether-amide or polyether-ester block copolymer and a maleic anhydride grafted metallocene-catalyzed copolymer of ethylene and octene, ethylene and hexene, or ethylene and butene, or a blend of these metallocene-catalyzed copolymers. Furthermore, the golf ball of this embodiment has a coefficient of restitution of at least about 0.75 and a compression of less than about 110.

In another embodiment, the invention is directed to a golf ball having a fluid-filled center which comprises a center shell having a hardness of about 30 to about 80 Shore C, a flexural modulus of about 500 psi to about 70,000 psi and a specific gravity of about 0.8 to about 2.5. In a preferred embodiment, the center shell has a hardness of about 50 to about 65 Shore C, a flexural modulus of about 3000 psi to about 20,000 psi and a specific gravity of about 1.3 to about 2.0, or more preferably from about 1.5 to about 1.9.

In a further embodiment, the invention is directed to a golf ball having a cover formed from a polyurethane composition, an example of which is disclosed in U.S. Pat. No. 5,334,673 which is incorporated herein by reference. The polyurethane composition may comprise at least one polyurethane prepolymer formed from 4,4'-diphenyl methane diisocyanate, 3,3'-dimethyl-4,4'-biphenyl diisocyanate, or para-phenylene diisocyanate, and a polyol that is cured with a polyamine selected from the group consisting of 3,5-dimethylthio-2,4-toluenediamine; 3,5-dimethylthio-2,4-toluenediamine; 3,5-dimethylthio-2,6-toluenediamine; N,N'-dialkyl diamino diphenyl methane; trimethylene glycol-di-p-aminobenzoate; polytetramethyleneoxide-di-p-aminobenzoate and mixtures thereof. The polyol may be selected from the group consisting of polytetramethylene ether glycol; poly(oxypropylene) glycol; polybutadiene glycol; 1,4-butanediol initiated caprolactone; diethylene glycol initiated caprolactone; trimethylol propane initiated caprolactone; neopentyl glycol initiated caprolactone; polyethylene adipate glycol; polyethylene propylene adipate glycol; and polybutylene adipate glycol.

In another embodiment, the invention is directed to a golf ball having a cover formed from a polyurea-based composition, for example as disclosed in U.S. Pat. No. 5,484,870, which is incorporated herein by reference, or an epoxy-urethane-based composition as disclosed in U.S. Pat. No. 5,908,358, which is incorporated herein by reference. In still further embodiments of the present invention, the golf ball cover may be formed from thermoset and thermoplastic compositions.

More generally, the present invention is directed toward golf balls comprising one or more layers having improved resistance to water permeation. Disclosed herein are blends of hydrophilic thermoplastic polymers and hydrophobic, olefinically-based polymeric materials, which are advantageously used in the construction of such layers to provide a reduction in the permeation of water through those layers.

In a further embodiment, the present invention is directed toward golf balls, incorporating the above-identified blends into the cover, into an intermediate layer disposed concentrically between the cover and the center and/or into the core, to improve resistance of the golf ball to water permeation by rendering these golf ball portions substantially resistant to permeation by water. It should be understood, moreover, that any or all of the cover, intermediate layer and/or core may comprise a plurality of layers.

Center shells, used in the formation of golf balls with fluid-filled centers, represent a preferred use for the blends of the present invention but, as noted above, these blends may be incorporated within substantially any layers(s) within the ball. Wound balls, for example, constructed with fluid-filled centers employing these polymer blends not only provide the same or superior play characteristics, but also provide improved resistance to water permeation, as compared to wound balls using hydrophilic polymer based fluid-filled center cores. It is also contemplated that fluid-filled centers of the present invention are useful in non-wound or "solid" golf balls, which comprise one or more layers of a solid material molded around a fluid-filled center core.

In one embodiment, the golf ball includes a cover and a core wherein either or both of the core and the cover may comprise a plurality of layers, with at least one of the layers comprising a blend of at least one hydrophilic thermoplastic polymer and at least one hydrophobic polymer. Preferably, the hydrophobic polymer is compatible with the hydrophilic thermoplastic polymer.

In a more specific embodiment, the hydrophilic thermoplastic polymer is a homopolymer, copolymer, terpolymer, block copolymer, grafted polymer, or some mixture of these. Similarly, the hydrophobic material may be selected from among a homopolymer, copolymer, terpolymer, block copolymer, grafted polymer, or a mixture thereof.

In a further embodiment, the hydrophilic thermoplastic polymer is selected from the group consisting of polyether-ester block copolymers, polyester-ester block copolymers, polyether-amide block copolymers, polyester-amide block copolymers, thermoplastic urethanes, and blends thereof. Similarly, the hydrophobic polymer may be selected from the group consisting of ethylene-glycidyl acrylate copolymers, ethylene-glycidyl methacrylate copolymers, maleic anhydride grafted metallocene-catalyzed copolymers of ethylene and octene, maleic anhydride grafted metallocene-catalyzed copolymers of ethylene and hexene, maleic anhydride grafted metallocene-catalyzed copolymers of ethylene and butene, ethylene-n-butyl-acrylate-glycidyl acrylate terpolymers, ethylene-n-butyl-acrylate-glycidyl methacrylate terpolymers, ethylene-methyl acrylate-glycidyl acrylate terpolymers, ethylene-methyl acrylate-glycidyl methacrylate terpolymers, ethylene-n-butyl acrylate-methacrylic acid based ionomers, ethylene-n-butyl acrylate-acrylic acid based ionomers, and mixtures thereof.

In one embodiment, the hydrophilic thermoplastic polymer is a polyether-amide or polyether-ester block copolymer, and the hydrophobic polymer is a maleic anhydride grafted metallocene-catalyzed copolymer of ethylene and octene, ethylene and hexene, or ethylene and butene, or a copolymer of ethylene-n-alkylacryalte-glycidyl acrylate or ethylene-n-alkylacryalte-glycidyl methacrylate.

The thermoplastic hydrophilic polymer may comprise, by weight, 99% to 1%, preferably 95% to 5%, and more preferably, 90% to 10% of the polymeric components of the blend. The at least one hydrophobic polymer may comprise, by weight, 1% to 99%, preferably 5% to 95%, and more preferably, 10% to 90% of the polymeric components of the blend. Optionally, the composition may include additional compatibilizers, density adjusting fillers, including metals and foaming agents.

The invention is also directed to a method for forming a golf ball with improved resistance to water permeation, comprising the steps of forming a golf ball core from a mixture comprising a blend of at least one hydrophilic thermoplastic polymer and at least one hydrophobic polymer and encasing that core in a cover to provide a golf ball. In a further embodiment of this method, the cover is formed of a mixture that comprises at least one hydrophilic thermoplastic polymer and at least one hydrophobic polymer, and which is used to encase a core, wherein the core may also comprise such a blend.

The invention is further directed to methods for forming multi-component golf balls with improved resistance to water permeation, comprising the steps of forming a golf ball center, covering the center in an intermediate layer to form a core, and encasing the core in a cover to provide a golf ball, wherein the center, core and cover may all comprise more than one layer, any of which may be formed from a mixture comprising a blend of at least one hydrophilic thermoplastic polymer and at least one hydrophobic polymer.

In a further embodiment, the invention is directed to a method for forming multi-component golf balls with improved resistance to water permeation, comprising the steps of forming a golf ball center, covering the center in a first intermediate layer to form a core, forming a second intermediate layer over the core and encasing the so-covered core in a cover to provide a golf ball, wherein at least one of the intermediate layers may be formed from a mixture comprising a blend of at least one hydrophilic thermoplastic polymer and at least one hydrophobic polymer. Any of the cover, intermediate layer or the core may comprise more than one layer, and any of the layers comprising the intermediate layer may comprise a blend of at least one hydrophilic thermoplastic polymer and at least one hydrophobic polymer.

This invention is also directed toward a method of making a golf ball having improved resistance to water permeation comprising the steps of forming a blend comprising at least one hydrophilic thermoplastic polymer and at least one hydrophobic polymer, forming a hollow center shell from the blend, filling the hollow center shell with a fluid, thereby providing a fluid-filled center, wrapping the fluid-filled center with an elastic thread, thereby providing a wound core, and encasing the wound core in a cover, thereby providing a golf ball having improved resistance to water permeation.

DETAILED DESCRIPTION OF THE PREFERRED EMBODIMENTS

Figure 1:
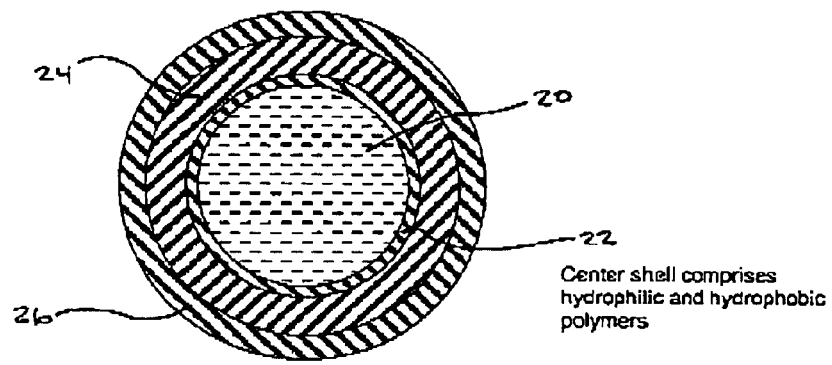
FIG. 1 is an illustration of one embodiment of the invention comprising a fluid-filled center 20, a center shell 22, an intermediate layer 24, and a cover 26, wherein the center shell comprises a blend of hydrophobic and hydrophilic polymers.
Figure 2:
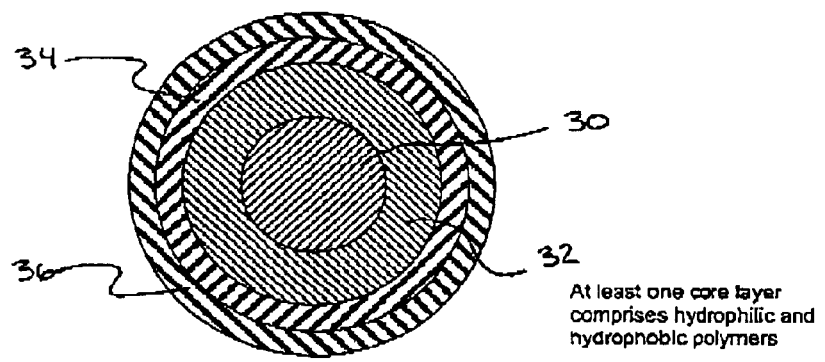
FIG. 2 is an illustration of another embodiment of the invention comprising a plurality of core layers 30 and 32, an intermediate layer 34, and a cover 36, wherein at least one of the core layers comprises a blend of hydrophobic and hydrophilic polymers.
Figure 3:
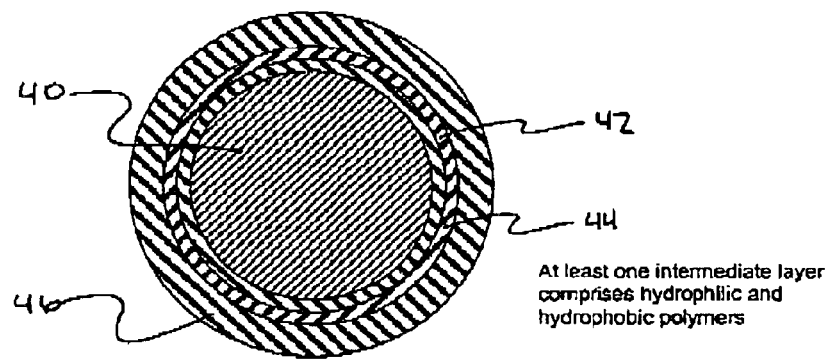
FIG. 3 is an illustration of one embodiment of the invention comprising a core 40, a plurality of intermediate layers 42 and 44, and a cover, wherein at least one of the intermediate layers comprises a blend of hydrophobic and hydrophilic polymers.
Figure 4:
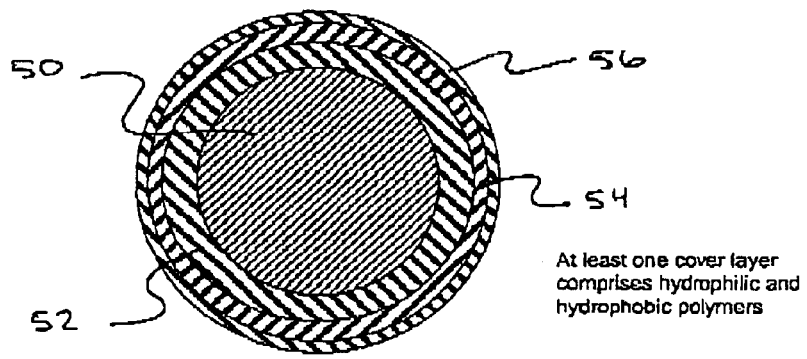
FIG. 4 is an illustration of another embodiment of the invention comprising a core 50, an intermediate layer 52, and a plurality of cover layers 54 and 56, wherein at least one of the cover layers comprises a blend of hydrophobic and hydrophilic polymers.

This invention is directed toward golf balls, preferably those having fluid centers, and even more preferably, those with wound fluid centers, with enhanced resistance to water permeation, formed of one or more layers which are substantially resistant to water permeation, and to methods for forming the same. As water permeation through a golf ball layer is difficult, if not impossible, to actually measure, such permeation is inferred herein from a decrease in the weight of a fluid-filled golf ball center due to the movement of water out of that center.

The polymeric blends disclosed herein, comprising one or more hydrophilic polymers combined with one or more hydrophobic polymers, are useful for forming one or more golf ball layers, adapted for producing golf balls with enhanced resistance to water permeation.

As used herein, the term "two-piece ball" includes a golf ball comprising a cover and a core. The terms "three-piece ball" or "multi-component ball" include a golf ball comprising a outer cover, center and intermediate layer disposed between the center and the outer cover. Three-piece and multi-component balls, therefore comprise at least one intermediate layer that may be a substantially water-resistant layer, comprised of a blend according to the invention, that is disposed between the outer cover and the center. The substantially water-resistant intermediate layer may be applied by compression molding, injection molding, casting, dipping, spraying or other method known to one of ordinary skill in the art. Any such layer or coating is encompassed within the term "intermediate layer" as used herein.

In one embodiment of this invention, blends of one or more hydrophilic polymers combined with one or more hydrophobic polymers may be used to form a golf ball cover or one or more of the layers of a multi-layer cover. Examples of hydrophilic polymers used in forming such golf ball covers include, but are not limited to, polyurethanes, particularly thermoplastic and castable polyurethanes, and polyether-amide, polyester-amide, polyether-ester, or polyester-ester block copolymers. A variety of additional useful hydrophilic polymers would be readily apparent to one of ordinary skill in the art. These hydrophilic polymers may be blended with hydrophobic polymers to provide golf ball covers or cover layers with reduced water permeability. Non-limiting examples of hydrophobic polymers that may be blended with the hydrophilic thermoplastic polymers to form golf ball covers, include ethylene-glycidyl acrylate copolymers, ethylene-glycidyl methacrylate copolymers, maleic anhydride grafted metallocene-catalyzed copolymers of ethylene and octene, maleic anhydride grafted metallocene-catalyzed copolymers of ethylene and hexene, maleic anhydride grafted metallocene-catalyzed copolymers of ethylene and butene, copolymers of ethylene-n-butyl-acrylate-glycidyl acrylate, copolymers of ethylene-n-butyl-acrylate-glycidyl methacrylate, ethylene-methyl acrylate-glycidyl acrylate, ethylene-methyl acrylate-glycidyl methacrylate, ethylene-n-butyl acrylate-methacrylic acid ionomers, ethylene-n-butyl acrylate-acrylic acid ionomers, and mixtures thereof.

In another embodiment of the present invention, blends comprising thermoplastic hydrophilic polymers and hydrophobic polymers may be used to form one or more additional layers in a two-piece or multi-component golf ball, e.g., a core layer or an intermediate layer. In this embodiment, one or more layers providing increased resistance to water permeation may be formed between the outer cover and the center. Furthermore, the hydrophobic polymers disclosed herein may be blended with one or more hydrophilic polymers used to form an intermediate layer, a solid center or one or more layers of a solid center, to provide increased resistance to water permeation through that layer or those layers. In a preferred embodiment, the blends of the present invention are employed in the formation of shells and hollow spheres for fluid-filled golf ball centers.

The following terms that are used in this application are defined in terms of the enumerated ASTM tests: Specific Gravity, ASTM D-297; Flexural (Flex) Modulus, ASTM D-790; and Shore D Hardness and Shore A Hardness, ASTM D-2240. The ASTM D-297 testing is performed at normal room temperature that is controlled to 20–23° C.

As used herein, the terms "points" or "compression points" refer to the compression scale based on the ATTI Engineering Compression Tester equipped with a Federal Dial Gauge Model 081-C. This scale, which is well known to those working in this field, is used in determining the relative compression of a core or ball.

As used herein, "COR" refers to Coefficient of Restitution, which is obtained by dividing a ball's rebound (ie. outgoing) velocity by its initial (i.e. incoming) velocity. This test is performed by firing the samples out of an air cannon at a vertical steel plate over a range of test velocities (from 75 to 150 ft./sec.). A golf ball having a high COR dissipates a smaller fraction of its total energy when colliding with the plate and rebounding therefrom than does a ball with a lower COR. Unless otherwise noted, the COR values reported herein are the values determined at an incoming velocity of 125 ft/sec.

As used herein, the term "glycidyl polymer" is defined as any homopolymer, copolymer, terpolymer, or mixture thereof, having at least one glycidyl group in at least one of the monomer repeat units in the polymer.

As used herein, the term "copolymer" refers to a polymer which is formed from two or more monomers, wherein said monomers are not identical.

As used herein, the term "terpolymer" refers to a polymer which is formed from three monomers, wherein said monomers are not identical.

The term "about," as used herein in connection with one or more numbers or numerical ranges, should be understood to refer to all such numbers, including all numbers in a range.

As used herein, the term "compatible" or a "compatibilized polymer blend" refers to a blend comprising at least one polymer component that has been chemically modified or synthesized in such a manner that it may then be mixed with other, chemically distinct polymeric materials, to form blends that are homogeneous on at least a macroscopic scale.

The terms "hydrophilic" and "hydrophobic," as used herein, are functionally defined. That is, for the purposes of this invention, a hydrophilic polymer is one that results in excessive water permeation through the layer of a golf ball into which it is formulated, unless blended with one or more of the hydrophobic polymers disclosed herein, which results in a reduction in water permeation which would otherwise occur in the absence of the hydrophobic polymer. Classification of a material as hydrophilic or hydrophobic in this context is, therefore, established empirically. That is, as discussed below, a defined fluid-filled center is formed from the material to be tested, and the loss of weight by that fluid-filled center is measured under specified conditions. Reductions in weight loss of the fluid-filled centers are indicative of improvements in the decrease of water permeation.

For the purposes of this empirical determination of water permeation resistance, a fluid-filled center is assembled with the material to be classified, using methods disclosed herein or by U.S. Pat. No. 5,836,831, the disclosure of which is incorporated by reference, in its entirety. The fluid-filled center is a sphere with a wall thickness of about 0.08 inch, a diameter of about 1.13 inch, and is filled with an aqueous solution having a specific gravity of about 1.20 to about 1.25. Examples of appropriate fluids include water, corn syrup, glycerol, salt solutions such as a solution of sodium sulfate, sodium bromide, potassium iodide and the like, gels, viscous fluids, alcohols, glycols and combinations thereof. Preferred fluids are salt solutions. Preferably, the fluids have a pH of between about 4.0 and about 8.0. The fluid-filled center is incubated for one week at about 110° F. in a chamber having a relative humidity of about 37%. If the fluid-filled center loses 0.4 gm or more in weight, the material used in the formation of the center shell is classified as hydrophilic for the purposes of this disclosure. Accordingly, if the fluid-filled center loses less than 0.4 gm weight, the material used in the formation of that center shell is classified as hydrophobic for the purposes of this disclosure. Similarly, if a second material can be combined with a first hydrophilic material to provide a blend used to form a fluid-filled center that loses less than 0.4 gm in weight under the same conditions, the second material is also classified as a hydrophobic material for the purposes of this disclosure. Classification of a material as hydrophobic, for the purposes of this disclosure, however, also requires that use of the second material does not result in a significant alteration of the coefficient of restitution, the compression, or the initial velocity of wound golf balls assembled using these fluid-filled centers, as compared to a control golf ball assembled without the hydrophobic material.

As used herein, "improved resistance," or "enhanced resistance" means substantially resistant to the passage of water.

This invention is directed toward golf balls comprising one or more layers formulated with the polymer blends disclosed herein, whereby the relevant layer(s) is substantially resistant to water permeation. In one embodiment, the invention is directed toward the formulation and use of polymer blends that, when used to form one or more layers of a golf ball, provide increased resistance to water permeation across that layer without significant effect on the physical or performance traits of golf balls incorporating these materials. Therefore, the compositions of this invention may be used in the formation of the cover, the core and the intermediate layer. The intermediate layer is defined herein as a single or multi-layer construct, disposed concentrically between the outer cover and the center. Furthermore, one or more of the cover, core or intermediate layer may comprise more than one layer, and, if desired, less than all of the layers forming the core, cover and/or intermediate layer may be formed from the materials disclosed herein. In a preferred embodiment, the blends disclosed herein are used in the formation of fluid-filled center shells adapted for incorporation within golf balls. The hydrophilic and hydrophobic polymers of the present invention comprise homopolymers, copolymers, terpolymers, block copolymers, or grafted polymers. They may be formed using metallocene catalysts and they may be modified after polymerization using materials and methods known in the art, which include grafting of functional moieties onto the polymer.

In an earlier attempt to improve the water permeation characteristics of the center shell composition of balls with fluid-filled centers, a preferred polyether-amide hydrophilic thermoplastic material was combined with a more hydrophobic polymer, ethylene-proplyene rubber dispersed in a polypropylene matrix. The results indicated that although the individual components possessed desired physical traits, the combination resulted in degradation in golf ball performance. However, applicants have now discovered that it is possible to combine selected materials, with markedly different properties, in a manner that provides blends that not only retain the flexibility and compressibility of the thermoplastic polymeric component but which also have incorporated a degree of resistance to water permeation typified by the more hydrophobic component of the blend.

The blends encompassed by the present invention include a large number of hydrophilic thermoplastic polymeric materials. Furthermore, the thermoplastic materials may be employed either alone or in combination with other such thermoplastic materials. Suitable hydrophilic thermoplastic materials include, but are not limited to, polyether-ester block copolymers, polyester-ester block copolymers, polyether-amide block copolymers, polyester-amide block copolymers, thermoplastic urethanes, and blends thereof.

Preferred hydrophilic thermoplastic materials include polyether-amide block copolymers and polyether-ester block copolymers. Preferred polyether-amide block copolymers are available under the tradename Pebax® (Elf Atochem, Philadelphia, Pa.). Preferred polyether-ester block copolymers are commercially available from DuPont (Wilmington, Del.) under the tradename Hytrel®.

Similarly, a number of olefinically based hydrophobic polymers are also contemplated as being useful in the present invention and each may be used either singly or combined with at least one other hydrophobic polymer. Suitable hydrophobic materials include, but are not limited to, ethylene-glycidyl acrylate copolymers, ethylene-glycidyl methacrylate copolymers, maleic anhydride grafted metallocene-catalyzed copolymers of ethylene and octene, maleic anhydride grafted metallocene-catalyzed copolymers of ethylene and hexene, maleic anhydride grafted metallocene-catalyzed copolymers of ethylene and butene, ethylene-n-butyl-acrylate-glycidyl acrylate terpolymers, ethylene-n-butyl-acrylate-glycidyl methacrylate terpolymers, ethylene-n-butyl acrylate-methacrylic acid based ionomers, ethylene-n-butyl acrylate-acrylic acid based ionomers and blends thereof.

The blends of the present invention may also comprise a suitable density-modifying filler material in order to adjust the properties of the finished center shell or other golf ball layer formed with the blends disclosed herein. For example, the specific gravity or density of the center shell may be modified by the addition of a suitable filler material, such as barium sulfate, zinc oxide, calcium carbonate, titanium dioxide, carbon black, kaolin, magnesium aluminum silicate, silica, iron oxide, glass spheres, wollastonite and mica, metals including nano composites. The filler material may be present in any amount that will adjust the specific gravity of the golf ball layer formed. Such filler material may range from about 5 percent by weight to about 70 percent by weight. More preferably, the filler material is present in an amount less than about 60 weight percent. The density-adjusting fillers may further include metals, foaming agents and other such materials, which are well known to those of ordinary skill in the art.

The thermoplastic hydrophilic polymers may comprise, by weight, about 99% to about 1%, preferably about 95% to about 5%, and more preferably, about 90% to about 10% of the polymeric components of the blend. Similarly, the hydrophobic polymers may comprise, by weight, about 1% to about 99%, preferably about 5% to about 95%, and more preferably, about 10% to about 90% of the polymeric components of the blend.

In one embodiment, the blends of the present invention are added to the composition used to form at least one cover layer. The cover may additionally comprise, for example, a castable or thermoplastic polyurethane. Particularly suitable materials, methods and equipment for the formation of polyurethane golf ball covers are disclosed in U.S. Pat. No. 5,334,673, U.S. Pat. No. 5,733,428 and U.S. Pat. No. 5,888,437, each of which is incorporated herein by reference, in its entirety. Thermoplastic polyurethanes useful in the invention may be made from a diisocyanate, such as 4,4'-diphenylmethane diisocyanate (MDI), 3,3'-dimethyl-4'-biphenylene diisocyanate (TODI), or para-phenylene diisocyanate (PPDI), reacted with a polyol and cured with a diol, such as 1,4-butanediol. Polyurethane covers formed in accordance with the present invention are the product of a polyurethane prepolymer cured with a curing agent such as a diamine or a glycol. The prepolymer, in turn, is the product of a reaction of a polyol and a diisocyanate. Suitable polyurethane prepolymers for use in the present invention are formed from a polyol, such as polyether, polyester or polylactone, and a diisocyanate. Suitable diisocyanates for use in the present invention include 4,4'-diphenylmethane diisocyanate (MDI) or 3,3'-dimethyl-4-4'-biphenylene diisocyanate (TODI).

Suitable polyether polyols include polytetramethylene ether glycol; polyoxypropylene glycol; and polybutadiene glycol. Suitable polyester polyols include polyethylene adipate glycol; polyethylene proplyene adipate glycol; and polybutylene adipate glycol. Suitable polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone.

Suitable curatives for use in the present invention are selected from the polyamine group consisting of 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate; or a difunctional glycol; and mixtures thereof. 3,5-Dimethylthio-2,4-toluenediamine and 3,5-dimethylthio-2,6-toluenediamine are isomers and are sold under the trade name ETHACURE® by Ethyl Corporation. Trimethylene glycol-di-p-aminobenzoates are sold under trade names POLAMINES® by Polaroid Corporation. N,N'-dialkyldiamino diphenyl methane is sold under the trade name of UNILINK® by UOP. Suitable difunctional glycols are 1,4-butanediol; 1,3-butanediol; 2,3-butanediol; 2,3-dimethyl-2,3-butanediol; dipropylene glycol; and ethylene glycol.

Polyurethane covers useful in the present invention preferably have a hardness of about 40 to about 70 Shore D, and, more preferably, a hardness of about 45 to about 60 Shore D.

Alternatively, other useful cover materials include, but are not limited to thermoplastics such as appropriate ethylene-based or propylene-based homopolymers, copolymers and block copolymers. These homopolymers, copolymers and block copolymers may include functional monomers such as acrylic and methacrylic acid, fully or partially neutralized ionomers and their blends, methyl acrylate, methyl methacrylate homopolymers and copolymers, and the like. Any of these polymers or copolymers may be further reinforced by blending with a wide range of density-modifying fillers, including foaming agents or glass spheres. Regardless of the materials included, the cover should have a Shore D hardness from about 40 to about 75, preferably from about 50 to about 70, more preferably from about 50 to about 65. One way to achieve this hardness is to include a very low modulus ionomer ("VLMI") in an amount up to about 70 weight percent. A variety of other suitable conventional cover blends are acceptable, so long as they provide the cover hardness described above. The selection of a suitable cover, and application thereof over the intermediate layer or core described herein, will be readily determinable by those of ordinary skill in the art when considering the disclosure herein.

The golf ball cover may also be formed from polyurea-based compositions, for example as disclosed in U.S. Pat. No. 5,484,870, which is incorporated herein by reference, or epoxy-urethane-based compositions as disclosed in U.S. Pat. No. 5,908,358, which is incorporated herein by reference.

The cover is preferably formed as a single layer having a thickness of about 0.02 to about 0.08 inches, preferably about 0.03 to about 0.07 inches, and more preferably about 0.04 to about 0.06 inches. The diameter of the intermediate layer corresponding to a particular center, and of the cover formed around the intermediate layer and center, may be adjusted according to the diameter of the center to provide a golf ball formed according to the invention with the overall minimum diameter required by the Rules of the United States Golf Association. One example of preferred ball dimensions according to the invention is a center having a diameter of about 1.13 inches and an intermediate layer formed from a tensioned elastomer having a thickness of about 0.225 inches to provide a wound core having a diameter of about 1.58 inch, along with a cover having a thickness of about 0.05 inches to provide an overall ball diameter of about 1.68 inches. A cover prepared using the appropriate amount of VLMI according to the invention should have a hardness from about 40 to about 75 Shore D, preferably from about 50 to about 70 Shore D.

Cover materials comprising the blends of the present invention may be applied to the core, for example, by injection molding, reaction injection molding or compression molding. When compression molding is used, the cover or cover layer may be pre-formed as ellipsoidal or hemispherical half shells using conventional compression or injection molding techniques. Cover half shells are then molded under conditions well known to those in the art.

In another embodiment, the blend of the present invention may be incorporated within one or more intermediate layers disposed between the center and the cover. Intermediate layers comprising the blends of the present invention may be formed by injection molding, reaction injection molding or compression molding. When the intermediate layer is formed by compression molding, the intermediate layer may be prepared from hemispherical or ellipsoidal half-shells using conventional compression or injection molding techniques, that will fit around the core or center and merge to form the intermediate layers or an intermediate layer where more than one intermediate layer is disposed between the center and the outer cover. When shells are ellipsoidal, the shells have thicker crowns at their top and bottom and a thinner equator, as compared to a conventional spherical intermediate layer, which has a constant diameter at any orientation.

After their formation, the shells are assembled about the center, either by and or by machine. The core typically comprises two shells and a center and is, preferably, assembled by compression molding. When the mold halves are combined, they form a rigid, spherical cavity. Once the mold is closed, any excess material from the shells is forced out of the mold cavity at the equator where the mold halves are joined. Specific conditions for molding the intermediate layer or layers will vary with the material used and will be well known to those skilled in the art.

As noted, the most preferred embodiment of the invention is the use of the materials disclosed herein to form hollow center shells used in constructing fluid-filled centers. The center shells of the present invention preferably have a wall thickness of about 0.01 inches to about 0.2 inches and a diameter of about 0.5 to about 1.5 inches. The thickness of the center shell walls typically correlates to, but is not necessarily limited by, the manner in which the shell is produced. For example, the walls of center shells produced by a blow molding process generally are thinner than those produced by other molding processes such as injection molding. The preferred thickness for the center shell wall will likely vary depending upon the performance requirements desired.

Additionally, the method of manufacture will affect other physical characteristics of fluid-filled golf ball centers made in accordance with the present invention. For example, in a preferred embodiment, the wall of the spherical core has a uniform thickness throughout. Such uniform thickness will result from the use of an injection molding method, such as the one described below to form the spherical core. This uniform thickness provides a beneficial contribution to a variety of in-flight characteristics of golf balls made with such cores including improved distance, accuracy and spin rate. Other molding methods for golf ball cores typically produce cores that are, to varying degrees, of a non-uniform thickness and as a result may be out-of-round, thereby adversely affecting the ball's in-flight characteristics.

In another embodiment of the present invention, the fluid-filled center comprises a seamless spherical core shell.

In a more particular example of the preferred embodiment discussed above, the present invention is directed towards a fluid-filled golf ball center which comprises a center shell formed from a thermoplastic material which is filled with a fluid. A number of the characteristics such as spin rate, initial velocity and "feel" of golf balls in which the present fluid-filled centers are incorporated are affected by the physical properties of the core shell material, the core shell diameter and thickness, and the fluid employed to fill the shell. Accordingly, a number of physical properties of the core shell and the fluid therein are important in optimizing the various ball play characteristics.

For example, the center shells of the present invention preferably have a hardness of about 30 to about 80 Shore C, more preferably, from about 50 to about 65 Shore C. Likewise, the center shells of the present invention preferably have a flexural modulus of about 500 psi to about 70,000 psi and more preferably about 3000 psi to about 20,000 psi.

Further, the center shells of the present invention preferably have a specific gravity of about 0.8 to about 2.5. More preferably the specific gravity of the center shell is about 1.3 to about 2.0 and, most preferably, about 1.5 to about 1.9.

The fluid employed to fill the core shells preferably has a specific gravity of about 1.0 to about 1.6. More preferably, the fluid has a specific gravity of about 1.15 to about 1.35. The center shells of the present invention may be filled with a variety of suitable fluids. Examples of appropriate fluids include water, corn syrup, glycerol, salt solutions such as a solution of sodium sulfate, sodium bromide, potassium iodide and the like, gels, viscous fluids, alcohols, glycols and combinations thereof. Preferred fluids are salt solutions. Preferably, the fluids have a pH of between about 4.0 and about 8.0, and a specific gravity of between about 1.15 and about 1.35, and, more preferably, about 1.20 to about 1.30.

The fluid-filled center shells of the present invention may be produced using any one of several methods. In particular, these methods exploit the beneficial physical properties of thermoplastic materials blended with hydrophobic polymers in order to provide more efficient and cost effective methods for producing golf balls with fluid-filled centers.

In a preferred embodiment of the method of the invention, center shells are formed by an injection molding process in which thermoplastic polymeric materials are injected into a closed mold, forming hemispheres which are later joined to form a hollow sphere. The thermoplastic materials employed in this process typically have a plastication temperature of about 200° F. to about 600° F.

The thermoplastic material, blended with one or more hydrophobic polymers, is injected into the mold at about 30 psi to about 2,000 psi (hydraulic pressure). As is well known in the injection molding art, the injection molding process may include multiple stages which have different pressures and are held at each pressure for different periods of time. The hemispherical shells are removed from the mold and bonded to form a spherical center shell. The hemispherical shells have a wall thickness of about 0.01 inches to about 0.2 inches and a diameter of about 0.5 inches to about 1.5 inches. This injection molding process provides center shells having a uniform wall thickness.

The hemispherical shells formed can be bonded together by a variety of methods, as disclosed in U.S. Pat. No. 5,836,831. For example, the two hemispherical shells can be joined by hot plate welding. In this method, the shells are presented to a hot plate under pressure in order to at least partially melt the contact surface. After contacting the hot plate surface, the hemispherical shells are brought into contact with each other in order to fuse the melted surfaces together. Typically, the temperature of the hot plate surface which is brought into contact with the thermoplastic is about 250° F. to about 750° F. Preferably, the hot plate temperature is about 350° F. to about 550° F. The contact pressure is generally about 10 psi to about 110 psi, preferably about 40 psi to about 60 psi. The weld time required to fuse the melt surfaces is typically 1 second to about 30 seconds, preferably about 4 seconds to about 12 seconds. Non-contact heat sealing methods such as the use of radiant heat sources or hot air convection can also be employed to melt the contact surfaces.

Another method of joining the injection-molded thermoplastic hemispherical shells is by spin welding. One of the hemispherical shells is rotated at high RPM and then its outer rim is brought into contact with the outer rim of a second hemispherical shell. The resulting friction generates a sufficient amount of heat to melt the polymer at the contact surface and form a satisfactorily bonded interface. Typically, one of the hemispherical shells is rotated at about 2,000 to about 20,000 RPM. The other hemispherical shell is placed against the rotating hemispherical shell for about 1 to about 15 seconds at a contact pressure of about 10 to about 200 psi.

The injection-molded spherical center shell of the present invention may also be formed by joining two hemispherical shells by a variety of alternate means, such as chemical bonding, thermal impulse welding, vibrational welding, ultrasonic welding, electromagnetic welding, tack welding, RF heat sealing, induction bonding, hot wire seaming, co-injection molding, or hot-melt sealing.

Alternatively, the center shells of the present invention may be formed by, for example, an extrusion blow molding process, co-extrusion blow molding, or an injection blow molding process, each of which is well known among those of ordinary skill in the art.

The center shells of the present invention can be filled with a fluid using a variety of methods. The hollow spheres may, for example, be filled with a fluid using the conventional method discussed above wherein the center is punctured with a hypodermic needle, injected with a fluid and the resulting hole is plugged with a thermally curable adhesive, a UV curable adhesive, a solvent or water based paint, a hot melt adhesive or a polymeric material.

In a preferred method, the fluid is introduced via a coaxial needle. Preferably, a vacuum of about 28.0 to about 28.5 inches Hg is formed inside the center shell using one channel of the coaxial needle and the vacuum is used to draw the fluid into the hollow sphere. After all of the fluid has been injected into the center, the puncture is cauterized with a hot rod, whereby molten material is introduced to the cauterized area and pressed with a rod to form an integral seal.

In another method, the centers are filled with a fluid by joining the hemispherical shells together while the hemispherical shells are submerged in a bath of such fluid. In this method, the hemispherical shells may be spin welded or otherwise bonded together while submerged in the fluid, thereby trapping the fluid inside the joined hemispherical shells to form a fluid-filled center. This mode of filling the hollow spheres is desirable in that it eliminates the need for patching or plugging any holes in the walls of the center.

In still another method, the center is filled by introducing the fluid through an inlet means which was integrally formed in a hemispherical shell or in the seamless center during the molding thereof. Such centers can be made by any of the processes discussed above. In this embodiment of the invention, the mold provides for an inlet means such as an aperture or hole through the wall of the hemispherical shell or seamless hollow sphere. The center is filled with a fluid through this hole and then the hole is heat sealed by melting the thermoplastic material around it, causing the material to flow into the hole and sealing it. The thermoplastic may be melted using any conventional techniques such as hot air or hot plate (thermostaking) methods. A preferred method of sealing the hollow spheres is blowing hot air on the inlet means and subsequently cold staking the molten material around the inlet means. These heat sealing methods may be employed to seal any of the center shells of the present invention, notwithstanding how they are produced.

Preferably, the inlet means comprises a protruded portion of thermoplastic material which extends from the outer surface of the center shell such that upon heat sealing, only this portion of thermoplastic material melts and flows into the hole, sealing the hollow sphere.

In summary, therefore, the center shells of the present invention are commonly employed in a golf ball having a multi-component construction including a wound intermediate layer. However, center shells of the present invention may also be employed in solid golf balls which comprise a center shell around which one or more layers of a solid material are molded. Likewise, the present invention also contemplates a golf ball which is formed of a core upon which a cover is directly molded or formed.

Without further elaboration, it is believed that one of ordinary skill in the art can, using the preceding description, utilize the present invention to its fullest extent. The following examples are merely illustrative and in no manner is the present invention limited to the specific disclosures therein.

EXAMPLES

Golf ball center shells used in forming fluid-filled centers of Examples 1 to 6, were produced using the blends of materials indicated in Table I, providing center formulations having a specific gravity of about 1.75. These compositions were injection molded with a multi-zoned, 85 ton Cincinnati injection molding machine having dual cavity hemispherical molds with flat bonding surfaces to form hemispherical shells.

The hemispherical shells were subsequently joined to form a hollow sphere using hot plate welding. These hollow spheres, i.e., center shells, were then filled with a fluid mixture of corn syrup (specific gravity 1.42), and sodium sulfate salt in water, wherein the mixture was further diluted with water to provide an ultimate solution having a specific gravity of about 1.25. The center shells were filled through a preformed inlet hole having a portion of thermoplastic material protruding from the surface of the shell, then sealed with a hot air, cold staking process. One group of centers, having the composition set forth in Table I, was used for an evaluation of weight loss under the conditions indicated in footnote 1, Table II.

TABLE I

| | Formulation (weight %) | | | | | |
|---|---|---|---|---|---|---|
| Example Number: | 1 (Control) | 2 | 3 | 4 | 5 | 6 |
| Pebax 3533[1] | 46 | 37 | 37 | 37 | 37 | 37 |
| Fusabond N MN 499D[2] | — | 9 | — | — | — | — |
| Elvaloy EP 4934-6[3] | — | — | 9 | — | — | — |
| Elvaloy EP 4934-8[d] | — | — | — | 9 | — | — |
| Lotader AX 8900[5] | — | — | — | — | 9 | — |
| Surlyn 9320[6] | — | — | — | — | — | 9 |
| Density-adjusting Filler (Zinc Oxide) | 54 | 54 | 54 | 54 | 54 | 54 |

[1]Block copolymer of copoly(ether-amide), Elf-Atochem (Philadelphia, PA).
[2]Metallocene catalyzed copolymer of ethylene and octene, grafted with maleic anhydride
[3]Terpolymer of ethylene, n-butyl-acrylate and glycidyl methacrylate, E. I. DuPont de Nemours & Company (Wilmington, DE).
[4]Copolymer of ethylene and glycidyl methacrylate, E. I. DuPont de Nemours & Company (Wilmington, DE).
[5]Terpolymer of ethylene, methyl acrylate (25%) and glycidyl methacrylate (8%), Elf-Atochem (Philadelphia, PA).
[6]Terpolymer of ethylene, n-butyl acrylate and methacrylic acid, partially neutralized with zinc cation, E. I. DuPont de Nemours & Company (Wilmington, DE).

The remaining fluid-filled centers were then frozen and wound with a tensioned, elastic thread to form a wound golf ball. These wound centers were then covered to form golf balls using a castable polyurethane, as disclosed in U.S. Pat. Nos. 5,3334,673, 5,733,428, and 5,888,437, which are incorporated herein by reference thereto. Finished balls were evaluated to determine the ball properties indicated in Table II.

TABLE II

| Example Number: | 1 (Control) | 2 | 3 | 4 | 5 | 6 |
|---|---|---|---|---|---|---|
| I. Weight loss of Center | | | | | | |
| Weight loss of the center (g)[1] | 0.56 | 0.33 | 0.34 | 0.27 | 0.35 | 0.37 |
| % Weight loss, with respect to the control[2] | — | 59% | 61% | 48% | 63% | 66% |
| II. Ball Properties | | | | | | |
| Compression[3] | 101 | 102 | 102 | 105 | 99 | 102 |
| Coefficient of Restitution[4] | .813 | .815 | .813 | .808 | .811 | .808 |

TABLE II-continued

| Example Number: | 1 (Control) | 2 | 3 | 4 | 5 | 6 |
|---|---|---|---|---|---|---|

[1]Weight loss by the fluid-filled centers was determined after incubation at 110° F., 37 ± 5% relative humidity, for one week.
[2]Calculated using the weight loss observed for the control defined as 100%, i.e., a lower number indicates diminished permeation.
[3]Compression was measured using an ATTI Engineering Compression Tester equipped with a Federal Dial Gauge Model 081-C.
[4]The coefficient of restitution was measured using an incoming velocity of 125 ft/sec.

Golf ball center shells, and fluid-filled centers of Examples 7 to 11, were formed using the blends of materials indicated in Table III. These compositions were injection molded to form hemispherical shells using a multi-zoned, 85 ton Cincinnati injection molding machine having dual cavity hemispherical molds with flat bonding surfaces.

The hemispherical shells were subsequently joined and then filled in the manner described above for examples 1–6. One group of centers, having the composition set forth in Table III, was used for an evaluation of weight loss under the conditions indicated below in footnote 1, Table IV.

TABLE III

| | Formulation (weight %) | | | | |
|---|---|---|---|---|---|
| Example Number: | 7 (Control) | 8 | 9 | 10 | 11 |
| Pebax 3533[1] | 46 | 36 | 32 | 28.5 | 21.5 |
| Fusabond N MN 499D[2] | — | 9 | 12.5 | 15.5 | 21.5 |
| Density-adjusting Filler (Zinc Oxide) | 54 | 55 | 55.5 | 56 | 57 |

[1]Block copolymer of copoly(ether-amide), Elf-Atochem (Philadelphia, PA).
[2]Metallocene catalyzed copolymer of ethylene and octene, grafted with maleic anhydride The remaining fluid-filled centers were then frozen and wound with a tensioned, elastic thread to form a wound golf ball. Wound centers were covered to form golf balls using a castable urethane. Finished balls were evaluated to determine the ball properties indicated in Table IV.

TABLE IV

| Example Number: | 7 (Control) | 8 | 9 | 10 | 11 |
|---|---|---|---|---|---|
| I. Weight loss of center | | | | | |
| Weight loss of the center (g)[1] | 0.52 | 0.37 | 0.30 | 0.24 | 0.14 |
| % Weight loss with respect the control[2] | — | 71% | 58% | 46% | 27% |
| II. Ball Properties | | | | | |
| Compression[3] | 97 | 97 | 97 | 96 | 95 |
| Coefficient of Restitution[4] | .808 | .810 | .810 | .808 | .808 |

[1]Weight loss by the fluid-filled centers was determined after incubation at 110° F., 37 ± 5% relative humidity, for one week.
[2]Calculated using the weight loss observed for the control defined as 100%, i.e., a lower number indicates diminished permeation.
[3]Compression was measured using an ATTI Engineering Compression Tester equipped with a Federal Dial Gauge Model 081-C.
[4]The coefficient of restitution was measured using an incoming velocity of 125 ft/sec.

Golf ball center shells used in forming the fluid-filled centers of Examples 12 to 15, were produced using the blends of materials indicated in Table V. These compositions were injection molded to form hemispherical shells. The hemispherical shells were formed using a multi-zoned, 85 ton Cincinnati injection molding machine having dual cavity hemispherical molds with flat bonding surfaces.

The hemispherical shells were subsequently joined and then filled in the manner indicated for Examples 1–6. One group of centers, having the compositions set forth in Table V, was used for an evaluation of weight loss under the conditions indicated below in footnote 1, Table VI.

TABLE V

| | Formulation (weight %) | | | |
|---|---|---|---|---|
| Example Number: | 12 | 13 | 14 | 15 |
| Pebax 3533[1] | 46 | 21.5 | 22.5 | 22.5 |
| Fusabond N MN 499D[2] | — | 21.5 | — | — |
| Elvaloy EP 4934-6[3] | — | — | 22.5 | — |
| Lotader AX8930[4] | — | — | — | 23 |
| Density-adjusting Filler (Zinc Oxide) | 54 | 57 | 55 | 55 |

[1]Block copolymer of copoly(ether-amide), Elf-Atochem (Philadelphia, PA).
[2]Metallocene catalyzed copolymer of ethylene and octene, grafted with maleic anhydride.
[3]Terpolymer of ethylene, n-butyl-acrylate and glycidyl methacrylate, E. I. DuPont de Nemours & Company (Wilmington, DE).
[4]Terpolymer of ethylene, methyl acrylate (24%), and glycidyl methacrylate (3%), Elf-Atochem (Philadelphia, PA).

The remaining fluid-filled centers were then frozen and wound with a tensioned, elastic thread to form a wound golf ball. Wound centers were covered to form golf 3 balls using a castable urethane material. Finished balls were evaluated to determine the ball properties indicated in Table VI.

TABLE VI

| Example Number: | 12 (Control) | 13 | 14 | 15 |
|---|---|---|---|---|
| I. Weight Loss of Center | | | | |
| Weight loss of the center (g)[1] | 0.52 | 0.14 | 0.15 | 0.19 |
| Weight loss - % of control[2] | — | 27% | 29% | 37% |
| II. Ball Properties | | | | |
| Compression[3] | 97 | 97 | 97 | 96 |
| Coefficient of Restitution[4] | .808 | .810 | .810 | .808 |

[1]Weight loss was measured upon fluid-filled centers after incubation at 110° F., 37 ± 5% relative humidity, for one week.
[2]Calculated using the weight loss observed for the control defined as 100%, i.e., a lower number indicates diminished permeation.
[3]Compression was measured using an ATTI Engineering Compression Tester equipped with a Federal Dial Gauge Model 081-C.
[4]The coefficient of restitution was measured using an incoming velocity of 125 ft/sec.

What is claimed is:

1. A golf ball comprising a fluid-filled center, a cover, and at least one intermediate layer interposed between the center and the cover, wherein the fluid-filled center comprises a center shell, said center shell formed from a composition comprising a blend of at least one hydrophilic thermoplastic polymer and at least one hydrophobic polymer.

2. The golf ball of claim 1 wherein the intermediate layer comprises at least one layer of tensioned elastomeric windings surrounding said fluid-filled center.

3. The golf ball of claim 1 wherein said composition comprises a blend of at least on polyether-amide block copolymer or a polyether-ester block copolymer, and a maleic anhydride grafted metallocene-catalyzed copolymer of ethylene and octene, a maleic anhydride grafted metallocene-catalyzed copolymer of ethylene and hexene, a maleic anhydride grafted metallocene-catalyzed copolymer of ethylene and butene or a blend of said metallocene-catalyzed copolymers.

4. The golf ball of claim 1 wherein the center shell has a hardness of about 30 to about 80 Shore C, a flexural modulus of about 500 psi to about 70,000 psi and a specific gravity of about 0.8 to about 2.5.

5. The golf ball of claim 4 wherein the center shell has a hardness of about 50 to about 65 Shore C, a flexural modulus of about 3000 psi to about 20,000 psi and a specific gravity of about 1.3 to about 2.0.

6. The golf ball of claim 5 wherein the center shell has a specific gravity of about 1.5 to about 1.9.

7. The golf ball of claim 1 wherein the hydrophilic thermoplastic polymer is a hydrophilic thermoplastic elastomer.

8. The golf ball of claim 1 wherein the hydrophobic thermoplastic polymer is compatible with the hydrophilic thermoplastic polymer.

9. The golf ball of claim 1 wherein said cover is formed from a polyurethane composition.

10. The golf ball of claim 9 wherein said polyurethane composition comprises at least one polyurethane prepolymer formed as a reaction product of either 4,4'-diphenyl methane diisocyanate or 3,3'-dimethyl-4,4'-biphenyl diisocyanate and at least one polyol, wherein the polyurethane composition is cured with at least one polyamine selected from the group consisting of 3,5-dimethylthio-2,4-toluenediamine; 3,5-dimethylthio-2,6-toluenediamine; N,N'-dialkyl diamino diphenyl methane; trimethylene glycol-di-p-aminobenzoate; polytetramethyleneoxide-di-p-aminobenzoate and mixtures thereof.

11. The golf ball of claim 10 wherein the polyol is selected from the group consisting of polytetramethylene ether glycol; polyoxypropylene glycol; polybutadiene glycol; partially or fully hydrogenated polybutadiene glycol; 1,4-butanediol initiated caprolactone; diethylene glycol initiated caprolactone; trimethylol propane initiated caprolactone; neopentyl glycol initiated caprolactone; polyethylene adipate glycol; polyethylene propylene adipate glycol; and polybutylene adipate glycol; and mixtures thereof.

12. The golf ball of claim 1 wherein said at least one intermediate layer is formed by compression molding, injection molding, casting, dipping, or spraying.

13. A golf ball comprising a cover, a core, and at least one optional intermediate layer, wherein the core comprises a plurality of layers, and wherein at least one of said plurality of layers comprises a blend of at least one hydrophilic thermoplastic polymer and at least one hydrophobic polymer, wherein said blend provides improved resistance to water permeation through said at least one layer.

14. The golf ball of claim 13, wherein the at least one hydrophilic thermoplastic polymer is a homopolymer, a copolymer, a terpolymer, a block copolymer, a graft copolymer, or a mixture thereof.

15. The golf ball of claim 13, wherein the at least one hydrophobic polymer is a homopolymer, a copolymer, a terpolymer, a block copolymer, a graft copolymer, or a mixture thereof.

16. The golf ball of claim 13, wherein the at least one hydrophilic thermoplastic polymer is selected from the group consisting of polyether-ester block copolymers, polyester-ester block copolymer, polyether-amide block copolymers, polyester-amide block copolymers, thermoplastic urethanes, and blends thereof.

17. The golf ball of claim 13, wherein the at least one hydrophobic polymer is selected from the group consisting of ethylene-glycidyl acrylate copolymers, ethylene-glycidyl methacrylate copolymers, maleic anhydride grafted metallocene-catalyzed copolymers of ethylene and octene, maleic anhydride grafted metallocene-catalyzed copolymers of ethylene and hexene, maleic anhydride grafted metallocene-catalyzed copolymers of ethylene and butene, ethylene-n-butyl acrylate-glycidyl methacrylate terpolymers, ethylene-n-butyl acrylate-glycidyl acrylate terpolymers, ethylene-methyl acrylate-glycidyl acrylate terpolymers, ethylene-methyl acrylate-glycidyl methacrylate terpolymers, ethylene-n-butyl acrylate-acrylic acid ionomers, ethylene-n-butyl acrylate-methacrylic acid ionomers, and mixtures thereof.

18. The golf ball of claim 13, wherein the at least one hydrophilic thermoplastic polymer is at least one of a polyether-amide block copolymer or a polyether-ester block copolymer, and the at least one hydrophobic polymer is at least one of a maleic anhydride grafted metallocene-catalyzed copolymer of ethylene and octene, a maleic anhydride grafted metallocene-catalyzed copolymer of ethylene and hexene, a maleic anhydride grafted metallocene-catalyzed copolymer of ethylene and butene or a blend of said metallocene-catalyzed copolymers.

19. The golf ball of claim 13, wherein the composition comprises from about 99% to about 1% of the hydrophilic thermoplastic polymer, by weight, and from about 1% to about 99% of the hydrophobic polymer, by weight.

20. The golf ball of claim 13, wherein the intermediate layer is present, and wherein said intermediate layer comprises a blend of at least one hydrophilic thermoplastic polymer and at least one hydrophobic polymer, said blend providing improved resistance to water permeation.

21. The golf ball of claim 13, wherein the hydrophobic polymer is compatible with the hydrophilic thermoplastic polymer.

22. A golf ball comprising a cover, a center and an intermediate layer, wherein the intermediate layer is disposed concentrically between the center and the cover, wherein the center and the intermediate layer comprise a plurality of layers, and wherein at least one of the plurality of layers comprises a blend of at least one hydrophilic thermoplastic polymer and at least one hydrophobic polymer, the blend providing resistance to water permeation.

23. The golf ball of claim 22, wherein the cover is formed from a thermoplastic or castable polyurethane.

24. The golf ball of claim 22, wherein the center is a fluid-filled center comprising a center shell, wherein the center shell comprises a blend of at least one hydrophilic thermoplastic polymer and at least one hydrophobic polymer.

25. The golf ball of claim 24, wherein the plurality of layers comprises at least one layer of tensioned elastomeric windings surrounding said center shell.

26. The golf ball of claim 22, wherein the at least one hydrophilic thermoplastic polymer is a homopolymer, a copolymer, a terpolymer, a block copolymer, a graft polymer, or a mixture thereof.

27. The golf ball of claim 22, wherein the at least one hydrophobic polymer is a homopolymer, a copolymer, a terpolymer, a block copolymer, a graft polymer, or a mixture thereof.

28. The golf ball of claim 22, wherein the at least one hydrophilic thermoplastic polymer is selected from the group consisting of polyether-ester block copolymers, polyester-ester block copolymers, polyether-amide block copolymers, polyester-amide block copolymers, thermoplastic urethanes, and blends thereof.

29. The golf ball of claim 22, wherein the at least one hydrophobic polymer is selected from the group consisting of ethylene-glycidyl acrylate copolymers, ethylene-glycidyl methacrylate copolymers, maleic anhydride grafted metallocene-catalyzed copolymers of ethylene and octene, maleic anhydride grafted metallocene-catalyzed copolymers of ethylene and hexene, maleic anhydride grafted metallocene-catalyzed copolymers of ethylene and butene, ethylene-n-butyl acrylate-glycidyl methacrylate terpolymers, ethylene-n-butyl acrylate-glycidyl acrylate terpolymers, ethylene-methyl acrylate-glycidyl acrylate terpolymers, ethylene-methyl acrylate-glycidyl methacrylate terpolymers, ethylene-n-butyl acrylate-acrylic acid ionomers, ethylene-n-butyl acrylate-methacrylic acid ionomers, and mixtures thereof.

30. The golf ball of claim 22, wherein the at least one hydrophilic thermoplastic polymer is at least one of a polyether-amide block copolymer or a polyether-ester block copolymer, and the at least one hydrophobic polymer is at least one of a maleic anhydride grafted metallocene-catalyzed copolymer of ethylene and octene, a maleic anhydride grafted metallocene-catalyzed copolymer of ethylene and hexene, a maleic anhydride grafted metallocene-catalyzed copolymer of ethylene and butene, or a mixture thereof.

31. The golf ball of claim 22, wherein the blend comprises from about 99% to about 1% of the hydrophilic thermoplastic polymer, by weight, and from about 1% to about 99% of the hydrophobic polymer, by weight.

32. The golf ball of claim 22, wherein the hydrophobic thermoplastic polymer is compatible with the hydrophilic thermoplastic polymer.

33. A method of making a golf ball, comprising the steps of:
   preparing a blend comprising at least one hydrophilic thermoplastic polymer and at least one hydrophobic polymer; and
   forming a core, an intermediate layer, and a cover, wherein the intermediate layer and cover comprise a plurality of layers, and wherein at least one layer of the intermediate layer and the cover is formed from the blend.

34. The method of claim 33, wherein the core comprises a plurality of layers.

35. The method of claim 34, wherein said core comprises a plurality of layers and wherein at least one said core layer is formed of said blend.

36. The method of claim 33, wherein the hydrophobic polymer is compatible with the hydrophilic thermoplastic polymer.

37. The method of claim 33, further comprising the steps of:
   c) forming a hollow center shell from said blend;
   d) filling the hollow center shell with a fluid, thereby providing a fluid-filled center;
   e) forming said intermediate layer around the fluid-filled center, thereby providing a core; and
   f) encasing the core in a cover.

38. The method of claim 37, wherein at least one layer of the intermediate layer is formed by wrapping the fluid-filled center with an elastic thread.

39. The method of claim 37, wherein at least one layer of the intermediate layer is a solid, non-wound layer.

40. The golf ball of claim 1, wherein the at least one hydrophobic polymer is selected from the group consisting of ethylene-glycidyl acrylate copolymers, ethylene-glycidyl methacrylate copolymers, maleic anhydride grafted metallocene-catalyzed copolymers of ethylene and octene, maleic anhydride grafted metallocene-catalyzed copolymers of ethylene and hexene, maleic anhydride grafted metallocene-catalyzed copolymers of ethylene and butene, ethylene-n-butyl acrylate-glycidyl methacrylate terpolymers, ethylene-n-butyl acrylate-glycidyl acrylate terpolymers, ethylene-methyl acrylate-glycidyl acrylate terpolymers, ethylene-methyl acrylate-glycidyl methacrylate terpolymers, ethylene-n-butyl acrylate-acrylic acid ionomers, ethylene-n-butyl acrylate-methacrylic acid ionomers, and mixtures thereof.

41. The golf ball of claim 1, wherein the golf ball has less than 0.4 grams weight loss.

42. The golf ball claim 13, wherein the golf ball has less than 0.4 grams weight loss.

43. The golf ball of claim 22, wherein the golf ball has less than 0.4 grams weight loss.

44. The method of claim 33, wherein the golf ball has less than 0.4 grams weight loss.

45. The method of claim 33, wherein the at least one hydrophilic thermoplastic polymer is a homopolymer, a copolymer, a terpolymer, a block copolymer, a graft polymer, or a mixture thereof and the at least one hydrophobic polymer is selected from the group consisting of ethylene-glycidyl acrylate copolymers, ethylene-glycidyl methacrylate copolymers, maleic anhydride grafted metallocene-catalyzed copolymers of ethylene and octene, maleic anhydride grafted metallocene-catalyzed copolymers of ethylene and hexene, maleic anhydride grafted metallocene-catalyzed copolymers of ethylene and butene, ethylene-n-butyl acrylate-glycidyl methacrylate terpolymers, ethylene-n-butyl acrylate-glycidyl acrylate terpolymers, ethylene-methyl acrylate-glycidyl acrylate terpolymers, ethylene-methyl acrylate-glycidyl methacrylate terpolymers, ethylene-n-butyl acrylate-acrylic acid ionomers, ethylene-n-butyl acrylate-methacrylic acid ionomers, and mixtures thereof.

* * * * *